United States Patent

Trexler

[11] Patent Number: 5,194,041
[45] Date of Patent: Mar. 16, 1993

[54] VENTILATION SYSTEM FOR ISOLATORS

[75] Inventor: Philip C. Trexler, Palatine, Ill.

[73] Assignee: Standard Safety Equipment Co., Palatine, Ill.

[21] Appl. No.: 740,058

[22] Filed: Aug. 5, 1991

[51] Int. Cl.[5] .............................................. F24F 7/06
[52] U.S. Cl. ..................... 454/251; 454/338
[58] Field of Search ................. 454/251, 338; 98/33.1, 98/39.1

[56] References Cited

U.S. PATENT DOCUMENTS

| 1,004,074 | 9/1911 | Powers | 454/251 X |
| 1,895,042 | 1/1933 | Long | 454/338 X |
| 2,184,484 | 12/1939 | Bojner | 454/251 X |
| 3,815,485 | 6/1974 | Deusink et al. | 454/338 |
| 4,023,472 | 5/1977 | Grunder et al. | 454/338 |

OTHER PUBLICATIONS

Isotec brochure "With the Latest in Technology for Isolator Equipment".

Untitled Isolator Photograph.
Lab Animal, Nov./Dec., 1990, vol. 19, No. 8, various pages.

Primary Examiner—William E. Tapoical
Attorney, Agent, or Firm—Wood, Phillips, VanSanten, Hoffman & Ertel

[57] ABSTRACT

A cage ventilation system for use in isolating a plurality of cages from an uncontrolled environment is provided, including a frame adapted to support cages in a plurality of vertically spaced shelves and an enclosure isolating all supported cages from the uncontrolled environment. A source of air from the uncontrolled environment is connected to the interior of tubes supported above each shelf in the frame, where each of the tubes has an axially disposed opening for outletting air over substantially the entire length of the associated row therebeneath. Each tube includes an interior opening which, in a plane perpendicular to the axial direction of the conduit, has an area which is less than the area of the outlet opening. The enclosure also includes an air outlet.

15 Claims, 1 Drawing Sheet

U.S. Patent    Mar. 16, 1993    5,194,041
Fig. 1
Fig. 3
Fig. 2
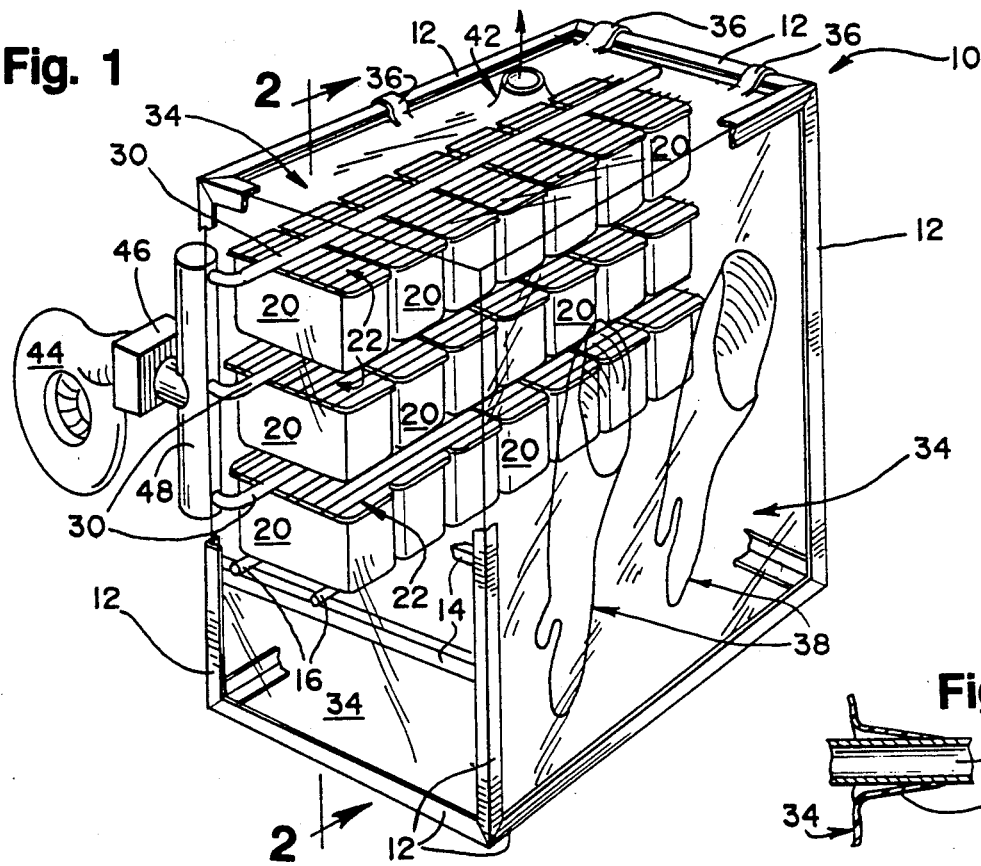
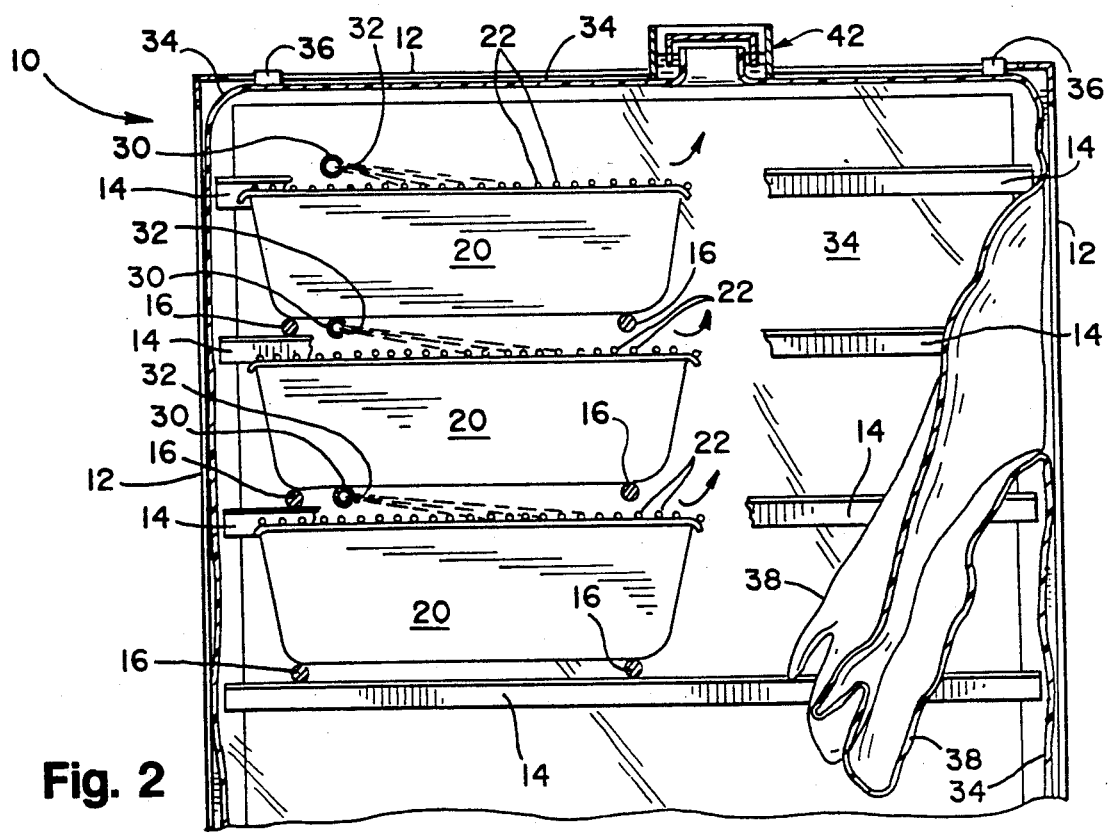

VENTILATION SYSTEM FOR ISOLATORS

BACKGROUND OF THE INVENTION

1. Technical Field

The present invention is directed toward isolators, and more particularly toward a ventilation system for isolators which control the environment of animals for experimental purposes.

2. Background Art

As medical science has progressed, the production of laboratory animals in germ-free (axenic) status has become desirable in order to obtain more statistically significant laboratory experiments. The maintenance of animals in long-term studies requires a consistent uniform environment. Also, it has become important to protect workers caring for the laboratory animals from the environment in which the laboratory animals are subjected, not only for safety reasons (for example, to protect workers from asbestos fibers, aerosols, or other toxic substances which may be either inhaled or absorbed by skin contact) but also in order to obtain valid interpretable test results with the animals.

A number of different types of isolators have been developed which encapsulate a cage or system of cages to separate the environment of the animals from that of the workers.

One isolator type includes a clear plastic enclosure which encapsulates a metal framework supporting a number of cages. Typically, these isolators are ventilated by introducing suitably filtered air through one or two ports and outletting the air through an exhaust port located elsewhere in the enclosure. However, even with such ventilation systems, there can be stagnant areas in the isolator, so that cages in those areas will not be properly ventilated. Proper ventilation is important not only to provide proper air to the animals but also to prevent the cages from becoming messy (for example, the animal urine will not suitably dry out without adequate ventilation). While the aesthetics of having a few "messy" cages may be of minimal importance, such different conditions in different cages within the same isolator could undesirably effect test results by making one of the most crucial presumptions of most such tests (i.e., that all of the animals were maintained in an identical environment) false.

Individual isolator cages equipped with a filter mechanism on the top of the cage controlling the quality of air to that respective cage have also been used. The filters used with these cages can, however, undesirably restrict the ventilation to each cage since the air is allowed to pass through the filter, but is not forced through. Further, such cages can be relatively expensive due to the requirement the each cage have its own filter structure. Still further, undesirably different environments can exist in different cages if each filter on each cage does not operate identically (an unlikely occurrence due to the changing air permeability of the filter media over time in each filter). As noted above, such different environments can negatively effect, or even invalidate, test results.

Yet another structure has been used includes individually isolated cages which are connected to a manifold providing a common air source for forced ventilation. While this structure can increase the flow and ventilation within the cage over that occurring in the individually filtered cages described above, it can produce an unhealthy draft in each cage. Further, this structure requires connectors for sealing each cage to the air source (which connectors must be constructed of a durable material which will not be damaged if chewed on by the animals), and therefore can be very expensive, particularly where large numbers of cages are needed. Still further, exacting handling of each cage is required in order to ensure that the connection of the cage to the air source is properly sealed each time a cage is added to the air source manifold. Failure to properly handle such cages can result in different environments in different cages and thereby negatively effect test results as discussed above.

The present invention is directed toward overcoming one or more of the problems discussed above.

SUMMARY OF THE INVENTION

In one aspect of the present invention, a cage ventilation system for use in isolating a plurality of cages from an uncontrolled environment is provided, including a frame adapted to support cages in a plurality of vertically spaced shelves and an enclosure isolating all supported cages from the uncontrolled environment. A source of air from the uncontrolled environment is connected to the interior of tubes supported above each shelf in the frame, where each of the tubes has an axially disposed opening for outletting air over substantially the entire length of the associated row therebeneath. The enclosure also includes an air outlet.

In another aspect of the present invention, each tube is integral to the frame and adapted to at least partially support any cages on the shelf immediately above the shelf over which the tube outlets air.

In still another aspect of the present invention, each tube includes an interior opening which, in a plane perpendicular to the axial direction of the conduit, has an area which is less than the area of the outlet opening.

It is an object of the present invention to provide an isolator which will provide an environment for animal experimentation which is reliably protected from external factors.

It is another object of the present invention to provide an isolator which is inexpensive to manufacture and maintain.

It is still another object of the present invention to provide a durable isolator not subject to damage resulting from animals enclosed therein.

Yet another object of the present invention is to provide an isolator with proper ventilation.

Therefore, yet another object of the present invention is to provide an isolator which will allow for animal experimentation with identical environments among all animal cages. A related object of the present invention is to also provide an isolator which allow the experimenter to reliably interpret the obtained results with minimal concern that the results have been impacted by the existence of different environments in different cages.

BRIEF DESCRIPTION OF THE DRAWINGS

FIG. 1 is a partially broken perspective view of an isolator embodying the present invention;

FIG. 2 is a partially broken cross-sectional view, taken along line 2—2 of FIG. 1; and FIG. 3 is a cross-sectional view illustrating the seal of the enclosure about one of the tubes of the present invention.

PREFERRED EMBODIMENT OF THE INVENTION

An exemplary embodiment of an isolator 10 including the cage ventilation system of the present invention is shown generally in FIG. 1.

The isolator 10 includes a three-dimensional rectangular frame 12 constructed of a durable material, such as lengths of suitable angled metals. Suitable shelf supports 14 are suitably secured (for example, by a nut and bolt combination) at vertically spaced locations on opposite ends of the frame 12. (The frame 12 and shelf supports 14 are broken away and/or only partially shown in FIGS. 1 and 2 in order to avoid clutter in the figures and thus provide clear illustration of the features of the present invention.)

Rigid bars 16 extend horizontally between shelf supports 14 at opposite ends of the frame 12. More specifically, at least two bars 16 are located at each height at which a shelf is desired to support a row of cages across the width of the isolator 10.

The bars 16 can be suitably supported by the supports 14 in any variety of ways. For example, the bars 16 can be mechanically attached to the supports 14. Alternatively, has often been found to be sufficient to allow the bars 16 to simply rest on the supports 14 with precautions taken to prevent rolling of the bars 16 on the supports 14 (as by attaching a non-cylindrical collar [not shown] to the bar 16 at the point at which it rests on the support 14).

The front to back spacing of the bars 16 defining a given shelf level is defined by the size of the cages 20 to be supported thereon. The vertical spacing of the supports 14 is also defined by the size of the cages 20. Thus, it is preferred that the upright legs of the frame 12 to which the supports 14 are attached have a large number of openings (not shown), as is typical with most metal shelving units, to allow for nut and bolt connections at virtually any level on the frame 12.

Virtually any type of cage 20 can be used with the present invention. The cages 20 may be open top in the sense that no filter is needed or desired to isolate the cages 20 from the environment in the isolator 10. However, suitable open mesh type lids 22 may be used with the cages 20 if desired to prevent the animals from getting out of the cages 20. Cages 20 of this type are extremely inexpensive as compared with many other cages required in other systems used in the prior art.

Further, as will be apparent once a complete understanding of the present invention is obtained, a single isolator 10 can be used with any number of different size cages 20, thereby allowing the cages 20 to be selected according to the type and number of animals to be included in each cage 20 for each particular experiment.

Also supported on the shelf supports 14 above each row of cages 20 is a tubular bar or tube 30. Each of the tubes 30 includes a longitudinal slit 32 along its lower half, and preferably off to one side. The tubes 30 can usually be made of inexpensive plastic. Further, if desired, the tubes 30 can function in place of one of the bars 16 for the shelf level above it to support the cages 20 in the row above (although, in such a case, the tubes should preferably be made of stronger material such as stainless steel).

As described in further detail hereafter, each of the tubes 30 provides uniform ventilation to each of the cages according to the present invention to ensure that all of the cages have identical environments so that the test results can be reliably interpreted with minimal concern that the results have been impacted by uncontrolled environmental factors.

A suitable enclosure 34 is supported by the frame 12 and defines the controlled environment desired for many animal experiments. Straps 36 are shown on the outside of the enclosure 34 for connecting the enclosure 34 to the frame 12. Of course, other suitable connections could be, and have been, used to secure similar enclosures to a frame, including, for example, short rods connected on one end to the frame and on the other end to eyelets formed along the edges of the enclosure.

Enclosures of this type are generally known in the art, and are typically made of a flexible film material such as clear plasticized polyvinyl chloride (PVC) adequate to seal the interior without concern of puncture while also allowing visual inspection within the enclosure 34. Also, in order to allow the experimenter to gain access to the cages 20 (for feeding, cleaning, etc.) without opening the enclosure 34, two large plastic gloves 38 are preferably formed integrally with the enclosure, as is generally known in the art.

The enclosure 34 also includes a plurality of conical seals 40 through which the bars 16 and tubes 30 extend (so as to extend across the interior of the enclosure 34 with their ends supported on the supports 14 outside the enclosure 34). Such seals 40 are generally known in the art, one such seal 40 being shown in FIG. 3. Specifically, the enclosure 34 can be formed with a plurality of inwardly directed conical portions which are completely closed. Where it is necessary for a bar 16 or tube 30 to pass through the enclosure 34, the conical portion can be cut off so as to make a circular opening which is less in diameter than the bar 16 or tube 30. Therefore, when the bar 16 or tube 30 is forced through the opening, the conical portion is elastically stretched so as to result in a naturally tight seal about the outside of the bar 16 or tube 30.

Of course, still other seals between the enclosure 34 and the bars 16 and tubes 30 would be suitable so long as the isolation of the interior of the enclosure 34 is maintained.

A suitable air vent (represented schematically at reference no. 42) is also included in the enclosure 34 to allow air out of the enclosure 34 as is required for the ventilation provided by the present invention. Suitable vents are known in the art, and typically use a fluid configuration to ensure that air pass through only one way (thereby preventing any contamination from getting into the enclosure through the vent 42).

The tubes 30 are each suitably connected to a source of air which has been filtered of unwanted elements so that environmentally controlled air is blown into the interior of each tube 30.

One configuration which might be used to generate an air flow into the interior of the tubes 30 is shown, for example, in FIG. 1.

Specifically, a suitable electric blower 44 blows air through a suitable filter 46 which functions to remove unwanted elements from the air and thereby provide an air source which meets the sterile requirements of the test (for example, HEPA filters supplied with an individual certificate of performance are commercially available and commonly used). The "clean" air exiting the filter 46 then passes to a suitable manifold 48 which evenly distributes the flow of "clean" air into the interior of each of the tubes 30.

The blower and filter arrangement shown in FIG. 1 are both located outside the enclosure 34, and therefore may be easily and inexpensively maintained and/or replaced.

It should be understood, however, that the blower, filter, and manifold arrangement shown in FIG. 1 is merely illustrative of an arrangement which might be used. Once a complete understanding of the present invention is obtained, the exact blower, filter, and manifold arrangement could readily be selected according to the precise needs of the isolator with which they are to be used.

As a result of the above described configuration, "clean" air is blown into the tubes 30 to generate a substantially uniform air flow and ventilation over each of the cages 20 located beneath the tubes 30.

Specifically, the tube slit 32 extends along the entire length of the tube 30 located above cages 20. The slit 32 may be continuous along the entire length, although it is preferable to provide periodic connections (i.e., portions where the tube cross-section is a complete circle) in order to ensure that the tube 30 does not twist or otherwise distort to make its slit 32 non-uniform.

It is also preferable that the total cross-sectional area defined by the openings of the slits 32 be substantially less than the area of the interior of the tube 30 (in a plane perpendicular to the tube axis). For example, in a ventilation tube having an internal diameter of ⅞ inch and thus an interior area of 0.60 square inch, a slit extending 60 inches over a row of cages 20 would preferably have a width of only about 0.008 inch (providing an opening area of 0.48 square inch). As a result of this arrangement, the "clean" air supplied at one end of each tube 30 will be uniformly expelled from the slits 32 along the entire length of the tube 30 (and thus a disproportionate amount of air will not be expelled from the portion of the slit 32 farthest from the manifold 48). Accordingly, a uniform air flow is provided across all of the cages 20, no matter where located, to provide ideal testing conditions as previously discussed.

Finally, it should be understood that the figures and the above description are intended to disclose the invention in such a manner that a person of ordinary skill in the art would be able to use the invention. For clarity, still other features or details which might also be used with isolators incorporating the present invention have not been shown in the figures but will be recognized by skilled artisans as also being usable if so desired. Such features include, but are not limited to, lockable casters attached to the isolator to ease movement of the isolator, a control valve to adjust airflow rate, a transfer port for efficient removal of food, waste, and animals, a sampling port to facilitate testing, and lights for illumination of the enclosure.

The above described isolator 10 therefore provides a large number of desirable features. First, the uniform ventilation ensures that identical environments are provided in all animal cages 20, and therefore the test results obtained will not be invalidated or effected by the existence of different environments in different cages 20. The effect of unequal conditions should not be minimized, since an animal kept in a damp, poorly ventilated environment for an extended period can clearly, for that reason alone, have its health adversely effected. Thus, worst case situations in animal experiments (in which invalid conclusions are reached due to lack of recognition of the effect of different cage conditions) are avoided by use of isolators which embody the present invention.

Further, this ideal operation is provided by use of minimum components (e.g., only one blower/filter arrangement is needed for all the cages) and with minimum cost components requiring minimal protection (e.g., the multiple cages used are all basic, simple inexpensive cages, and the tubes 30 may be made of inexpensive plastic as they are not susceptible to damage from animal contact).

In summary, isolators embodying the present invention provide maximum reliability at minimum cost.

Still other aspects, objects, and advantages of the present invention can be obtained from a study of the specification, the drawings, and the appended claims.

I claim:

1. A cage ventilation system for use in isolating a plurality of cages from an uncontrolled environment, comprising:
   a frame adapted to support cages in a plurality of vertically spaced shelves;
   an enclosure isolating all supported cages from the uncontrolled environment;
   means for generating a flow of air from the uncontrolled environment;
   tubes supported above each shelf in the frame, each of said tubes having an axially disposed opening for outletting air over substantially the entire length of the associated shelf therebeneath;
   means for connecting the flow from the generating means to the interior of the tubes; and
   means for allowing air to outlet from the enclosure.

2. The cage ventilation system of claim 1, wherein each tube includes an interior opening which, in a plane perpendicular to the axial direction of the tube, has an area which is greater than the area of the axially disposed outlet opening.

3. The cage ventilation system of claim 1 wherein each tube is integral to the frame and adapted to at least partially support any cages on the shelf immediately above the shelf over which the tube outlets air.

4. The cage ventilation system of claim 3 wherein said outlet openings are on the lower half of each tube.

5. The cage ventilation system of claim 1 wherein the generated flow of air is filtered of unwanted contents.

6. The cage ventilation system of claim 1 wherein the outlet opening of each tube comprises a plurality of axially spaced slit sections.

7. A flexible film animal isolator comprising:
   a shelving unit including a plurality of shelves;
   a plurality of cages to separately contain animals used in experimentation in a controlled environment, said cages being disposable on said shelves;
   a flexible film protective enclosure encapsulating said shelving unit;
   a plurality of conduits including one such conduit disposed above each shelf, each of said conduits having an axial outlet opening along substantially the entire length of the below located shelf to provide substantially uniform airflow over the shelf;
   means for providing an airflow into said conduits; and
   means for venting airflow from the enclosure.

8. The isolator of claim 7, wherein each conduit includes an interior opening which, in a plane perpendicular to the axial direction of the conduit, has an area which is greater than the area of the outlet opening.

9. The isolator of claim 7, wherein each conduit is integral to the shelving unit and adapted to at least partially support any cages in the row immediately above the row over which the conduit outlets air.

10. The isolator of claim 7, wherein said outlet openings are on the lower half of each tube.

11. The isolator of claim 7, wherein the provided airflow is filtered of unwanted contents.

12. The isolator of claim 7, wherein the outlet opening of each conduit comprises a plurality of axially spaced slit sections.

13. An isolator for protecting a plurality of cages from external environmental conditions, comprising:

an enclosure having an interior which is sealed from external environmental conditions;

a frame within said enclosure;

vertically spaced bars supported on said frame in a generally horizontal orientation to define a selected plurality of levels;

a plurality of cages, each cage supported at a selected level on the bars associated with the selected level;

at least one bar supported on said frame in a generally horizontal orientation above the cages of each level, each such bar being generally tubular with a hollow interior and narrow opening along its length;

means for connecting each of said bars to an overpressured source of air from which undesirable external environmental contents have been removed; and means for venting overpressured air from the enclosure interior.

14. The isolator of claim 13, wherein each bar includes an interior opening which, in a plane perpendicular to the axial direction of the bar, has an area which is greater than the area of the narrow outlet opening along the bar.

15. The isolator of claim 13, wherein the outlet opening of each bar comprises a plurality of axially spaced slit sections.

* * * * *